CHARLES H. STROWGER.

Improvement in Fences.

No. 120,546.  Patented Oct. 31, 1871.

Witnesses:
G. Mathys.
C. A. Pettit

Inventor:
Charles H. Strowger.
per Munn & Co
Attorneys.

120,546

UNITED STATES PATENT OFFICE.

CHARLES H. STROWGER, OF WEBSTER, NEW YORK.

IMPROVEMENT IN FENCES.

Specification forming part of Letters Patent No. 120,546, dated October 31, 1871.

*To all whom it may concern:*

Be it known that I, CHARLES H. STROWGER, of Webster, in the county of Monroe and State of New York, have invented a new and Improved Picket-Fence; and I do hereby declare that the following is a full, clear, and exact description of the same, reference being had to the accompanying drawing forming a part of this specification, in which—

Figure 1:
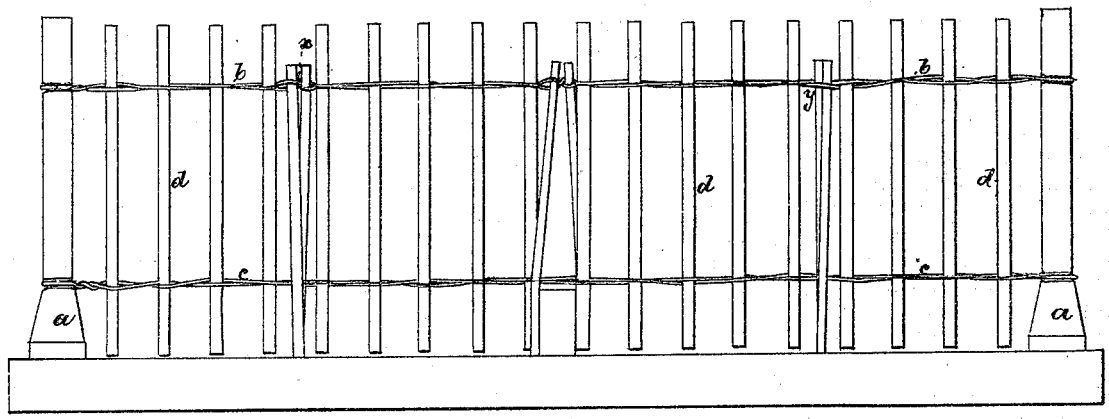
Figure 2:
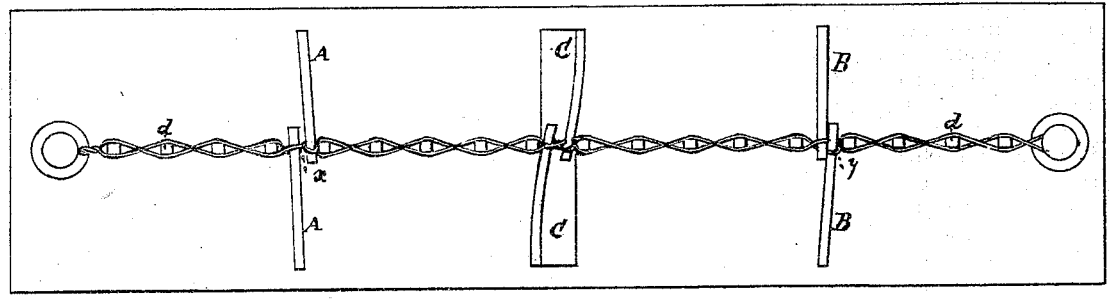

Figure 1 is a side elevation, and Fig. 2 is a top view.

This invention relates to picket-fence supported upon horizontal wires stretched between posts placed one at each end of the fence; the invention consisting in the manner of connecting the supporting-stakes or braces with the upper set of wires.

Referring to the drawing, $a$ is the end post of the fence, set firmly in the ground. $b$ is the upper set of wires, and $c$ the lower set. These sets, each consisting of two wires, are stretched in the first instance between the terminal posts, one set near the top and the other near the bottom of the same. The pickets $d$ are then interwoven, one at a time, with the wires, by crossing the latter in each set and then slipping the picket previously placed between the wires of both sets, backward into the crotches of the wires. A guide consisting of a picket having staples or eyes for the wires to run through is connected with the wires and kept at a suitable distance in front of the workman, for the purpose of keeping the upper and lower sets at a proper distance apart, and also of preventing the wires from twisting along their whole length owing to their crossing in front of each picket. This manner of building fence is no part of my invention.

A B represent stakes for giving lateral support to the fence by connection with the upper set of wires $b$. This connection may be effected in two different ways, shown respectively at $x$ and $y$. At $x$ the stakes A are shown as connected with wires during the building of the fence, and in the same manner as the pickets—that is to say, the upper end of one of the stakes is pressed firmly into the crotch of the wires, and the upper end of the other stake is then laid against the first, after which the wires are crossed as usual. The bottoms of the stakes A are firmly imbedded in the ground prior to the connecting of their tops with the fence. At $y$ the stakes B are shown as connected with the wires after the building of the fence, and this is done by leaving the wires $b$ between the pickets where the stakes are to be introduced uncrossed. The stakes are raised bottom upward, their upper ends inserted between the wires $b$ and the stakes then turned downward, thus twisting the wires. The fence at this part is then raised up high enough to allow the bottoms of the stakes B to drop into holes in the ground previously prepared for them. The pickets at one or both sides of the stakes are extended into the ground to make the fence more firm. The bottoms of the stakes may be fastened to sills, as shown at C. A fence thus constructed is exceedingly strong and very durable and cheap.

While I disclaim the construction of the fence proper, or the method of interweaving the pickets with the wires, I also wish to be understood as making no claim to the combination, broadly, of stakes or inclined braces with such or other fence, in which the pickets are supported by wires; but

Having thus described my invention, what I claim as new, and desire to secure by Letters Patent, is—

The stakes A A and B B, notched at their upper ends, and connected with the upper set $b$ of wires, in the manner shown and described, whereby the wires are strained and the fence rendered complete, as specified.

C. H. STROWGER.

Witnesses:
SOLON C. KEMON,
CHAS. A. PETTIT.

(52)